Patented June 21, 1932

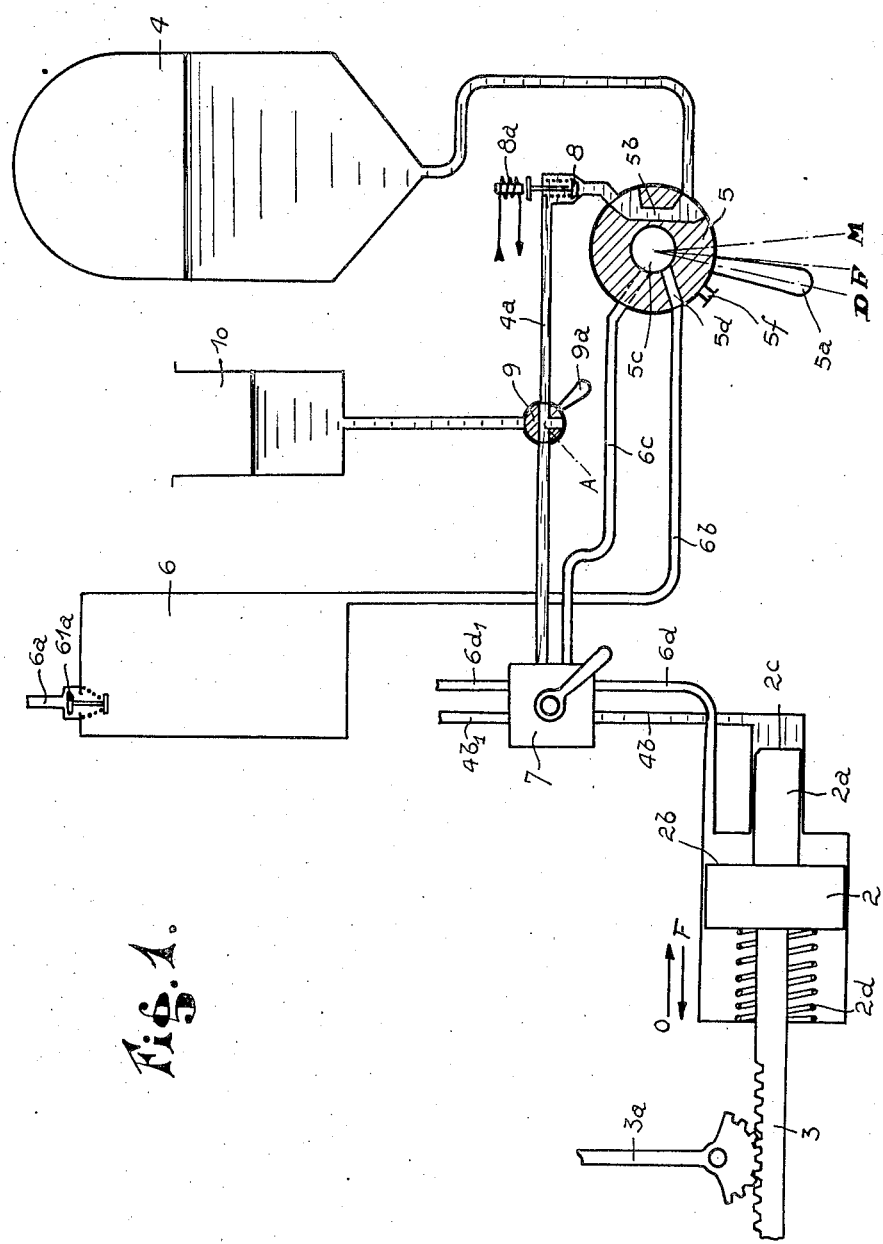

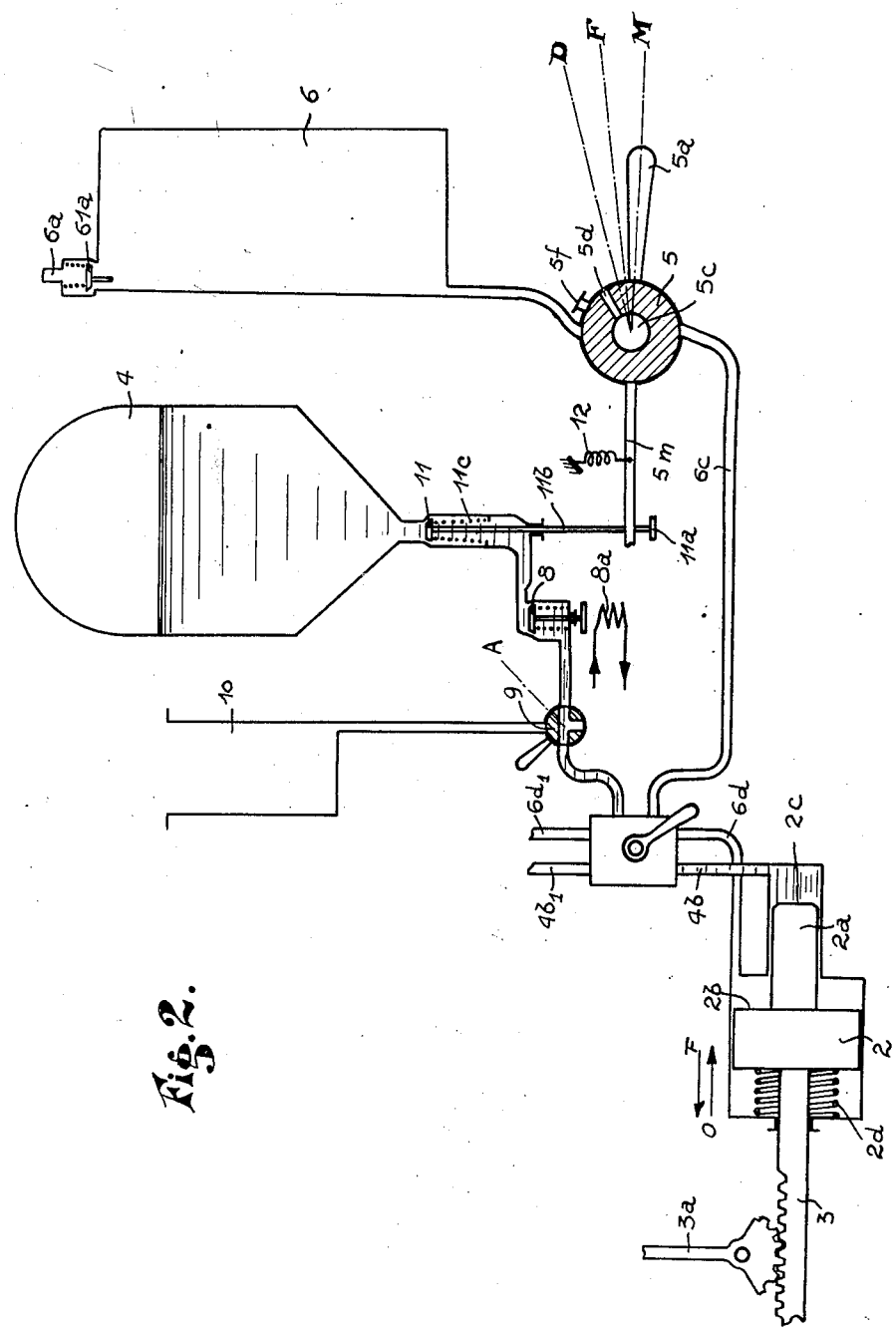

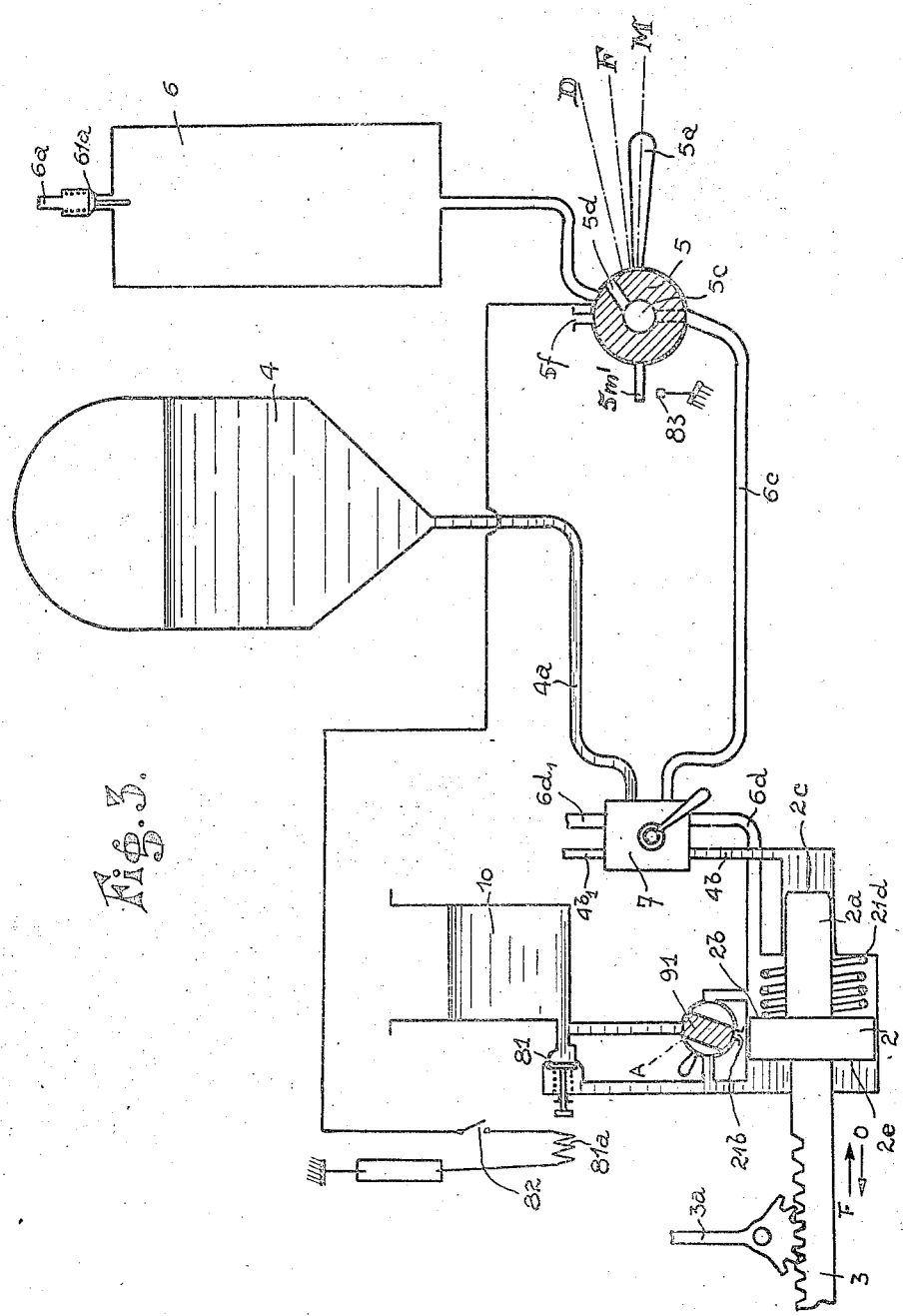

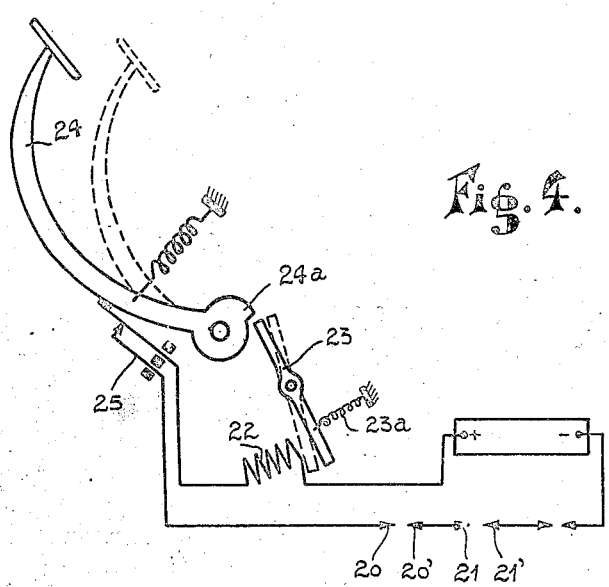
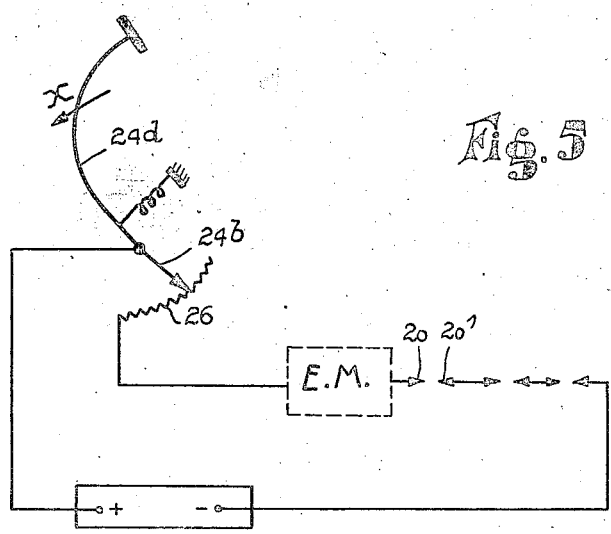

1,864,468

UNITED STATES PATENT OFFICE

HENRI PIEPER, OF BRUSSELS, BELGIUM, ASSIGNOR TO COMPAGNIE INTERNATIONALE DES FREINS AUTOMATIQUES, SOCIETE ANONYME, OF LIEGE, BELGIUM

CONTROL DEVICE FOR VEHICLE DOORS

Application filed May 12, 1931, Serial No. 536,920, and in Belgium May 21, 1930.

The present invention relates to a device for controlling doors, which is particularly applicable to vehicles provided with or having available a source of vacuum.

This source of vacuum is formed for example by the suction of an internal combustion engine fitted on the vehicle (case of a motor bus) or by the action of a steam injector.

According to the invention, one of the operations in manipulating the doors (opening or closing) is produced by using a reserve of energy placed on the vehicle, for example liquid under pressure, the energy expended being restored during the reverse operation by the action of the vacuum.

Moreover, it is known that when the vehicle is at rest the motor is running slowly, the suction duct is throttled and consequently the suction due to the vacuum is high; the invention provides for this vacuum to be employed advantageously for opening the doors.

Another feature of the invention resides in the fact that the doors are locked in their closed position as long as one or more of the following conditions are not fulfilled:
1. Brakes applied;
2. Engine declutched;
3. Vehicle at rest or practically so.

With regard to the third condition, it is to be noted that motor buses or like vehicles are provided with a dynamo driven by the engine and adapted to charge the lighting accumulators or to start the accumulators by means of an automatic make-and-break. In view of the fact that the engine is generally only declutched at the moment of stopping and that the make-and-break of the dynamo is released when the speed of the dynamo has become insufficient to obtain the voltage of the accumulators, according to the invention this make-and-break, in its released position, closes the circuit of an electro-magnet of an unlocking valve.

The invention also provides devices for preventing the starting of the vehicle as long as all the doors are not closed, for example by not permitting the clutch to be engaged in this case or preventing the release of the brakes.

For this purpose, contacts arranged in series close the circuit of an electro-magnetic clutch or of a rocking system acting on the clutch or brake pedals when the doors are closed.

According to the invention, alarm members are also provided which are arranged near the passengers and are adapted to open the doors in case of emergency.

For this purpose the closure of the doors may be obtained against the action of a return spring and one or more independent valves placing the face of the power piston upon which the pressure or vacuum acts into communication with the atmosphere so as to permit the door to be opened in this case by the expansion of the return spring.

The accompanying drawings indicate by way of example and in a non-limiting manner two embodiments of the invention. The latter extends to the various original features which the arrangements shown comprise.

Figure 1 is a diagrammatic view of a control device according to the invention.

Figure 2 relates to a modification of the device.

Figure 3 relates to a modification in which the closure of the doors is effected under the action of the suction, this modification being applied by way of example to the mechanism shown in Figure 2.

Figure 4 shows a diagrammatic view of the control for the clutch or brake pedal.

Figure 5 is a diagrammatic view of the control for an electro-magnetic clutch.

In the case shown in Figure 1, the door is controlled by a differential piston 2, 2a to which is connected a rack 3 determining the displacement of an arm 3a acting upon the door. The annular face 2b of the differential piston may be subjected to the action of a vacuum, while the face 2c of the small piston 2a is acted upon by the liquid under pressure. This liquid under pressure is contained in a reservoir 4 and communicates with the face 2c through the control member 5 of the ducts 4a and 4b. The suction vacuum of the internal combustion engine intended to drive the vehicle on which the doors are mounted acts through a duct 6a and through a retaining valve 61a in a reservoir 6 intended to render the action of this vacuum uniform. The latter may be transmitted through the duct 6b, the control member 5 and the ducts 6c and 6d to the annular space 2b of the piston 2.

In order to permit the doors on the left or on the right of the vehicle to be controlled separately and at will, a system of valves, shown diagrammatically at 7, permits the ducts 4a and 6d or the similar ducts 4b₁ and 6d₁ to communicate with the differential piston or pistons controlling the other doors.

In the position D of the hand lever 5a illustrated, the control member 5 formed by a valve is in the open door position, this position of the doors being obtained by the action of the vacuum. For this purpose, the liquid in the reservoir 4 communicates through the passage 5b of the valve 5 and through the ducts 4a and 4b with the face 2c of the differential piston, while the vacuum existing in the reservoir 6 communicates through the ducts 6b, 6c and 6d with the annular face 2b of this piston. For this purpose, the duct 6c communicates primarily with the central space 5c of the valve 5, this space being put into communication with the duct 6b through the movable passage 5d.

Under the action of the suction the differential piston 2, 2a moves in the direction of the arrow O while causing the doors to open and the liquid to be delivered by the face 2c into the reservoir 4.

The hand lever 5a is placed in the position F, and the communication between the reservoir 4 and the cylinder of the piston 2a remains unchanged, but the central space 5c of the valve and consequently the annular face 2b of the differential piston is made to communicate through the duct 5d with an aperture 5f communicating with the atmosphere. Under the action of the liquid under pressure, the piston moves in the direction of the arrow F, while compressing a spring 2d and causing the doors to close.

In the position M of the lever 5a, the different positions are cut in such a way that the piston is locked in the closed position of the doors.

A valve 8 arranged in the duct 4a communicating between the reservoir 4 and the piston is arranged in such a way as to prevent the flow of liquid to the reservoir 4 and consequently to lock the doors. This valve may be opened under the action of an electro-magnet 8a the circuit of which may be closed either by the action of the brake pedal when the latter is in the broken position, or by a centrifugal switch fitted for example to one of the wheels of the vehicle or upon the transmission shaft of the engine, or by both these means simultaneously by arranging the switches in series in the circuit of the electromagnet. This circuit may also be controlled by releasing the cut-out of the electric dynamo driven by the engine of the vehicle as specified above.

In this manner the doors are only permitted to open when the vehicle is at rest or travelling at a low speed.

The invention is not limited to the electrical control of the valve 8 but also provides for the use of any control system, mechanical, hydraulic, etc.

Upon the duct 4a through which the liquid flows are arranged one or more valves such as 9 which are normally arranged in the manner illustrated. In the case of an alarm, this valve may be operated by the passengers and independently of the operation of the member 5 so that the hand lever 9a occupies the position A. In this position the face 2c of the piston is put into communication with the reservoir 10 which is open while the communication between the said face and the reservoir 4 is closed. In this manner the differential piston 2, 2a moves under the action of the return spring 2d in the direction of the arrow O corresponding to the opening of the doors while it delivers liquid into the reservoir 10.

If the closing of the doors was effected by the action of the vacuum by compressing a return spring, the alarm valve would have the function of putting the annular face 2b in communication with the atmosphere and of cutting off the communication between the said face and the reservoir 6.

The valve system 7 is arranged between the valves 9, 8 and 5 and the differential piston, so that these valves can be employed for the control of the left hand doors or the right hand doors of the vehicle.

The arrangement according to Figure 2 is analogous to that shown in Figure 1 and only differs in the mode of action of the control member 5 on the flow of the liquid contained in the reservoir 4.

In the case of this figure, the control member 5 comprises a rod 5m which, in the position corresponding to the opening of the doors, comes into contact with the stop 11a provided upon the rod 11b of the valve 11 controlling the communication between the reservoir 4 and the differential piston 2, 2a.

In the position M of the hand lever 5a of the control member; the communication between the duct 6c and the reservoir 6 is cut off and the rod 5m is separated from the stop 11a so that the valve 11 will be closed under the action of its spring 11c.

In the position F the duct 6c communicates with the atmosphere through the aperture 5f, and the valve 11 is opened by the action of the rod 5m on the stop 11a so as to cause the doors to close.

In the position D of the hand lever, the valve 11 is opened under the action of the rod 5m, and the duct 6a is in communication with the source of vacuum 6, this position corresponding to the opening of the doors.

The hand lever 5a constantly tends to be situated in the travelling position M on account of a spring 12. Nevertheless, it may be held momentarily in the position D by a locking system, not shown.

In the case shown in Figure 3, the doors are closed under the action of the vacuum operating on the annular face 2b of the piston 2. The back part of the cylinder in which the piston moves is filled with liquid and can communicate through an automatic valve 81 with a discharge reservoir 10 open to the atmosphere. The charge reservoir 4 communicates in a permanent manner with the face 2c of the piston 2a.

In the position M of the hand lever 5a the communication between the reservoir 6 and the face 2b of the piston is cut off. Any displacement of the piston in the direction for opening the doors is prevented by the action of the automatic valve 81 pressed against its seating.

In the position F of the hand lever 5a the communication between the reservoir 6 and the face 2b is established by means of the duct 5d provided in the valve 5.

Under the action of the vacuum, the piston 6 moves in the direction of the closure of the doors while driving liquid by its face 2c into the reservoir 4.

In the position D of the hand lever 5a the annular face 2b of the piston communicates with the atmosphere through the duct 5d mentioned above, and the aperture 5f. Consequently the pressure of the liquid operates so as to move the piston in the direction of the arrow O corresponding to the opening of the doors. This displacement is nevertheless permitted only for as long as the valve 81 is opened by the action of its electro-magnet 81a, the circuit of which is closed when the vehicle is at rest or travelling at a low speed, and when the hand lever occupies the position D.

For this purpose, the cut out of the electric dynamo of the vehicle closes the contact 82 when it is released, while an arm 5m following the movements of the hand lever 5a makes contact in its position D with a contact 83 connected in the circuit of the electro-magnet 81a mentioned above.

The valve 91, which is normally held in the position shown, is adapted to permit the doors to be opened in case of emergency. For this purpose, when it is placed in the position A, it simultaneously puts the face 2e of the piston 2 into communication with the reservoir 10 and the face 2b of the piston 2 in communication with the atmosphere through the duct 21b.

In the case of the device shown in Figures 1 to 3, the doors can also be opened in case of emergency by disengaging the door from its control system 3a, 3.

In the case shown in Figure 4, contacts arranged in such a way as to be closed when the doors reach the end of their closing movement (shown diagrammatically by the arrows such as 20—20', 21—21') are arranged in series in the circuit of an electro-magnet 22 acting upon a pawl 23 acted upon by a spring 23a. This pawl is adapted to penetrate behind a projection 24a on a pedal 24 when this pedal is completely depressed. In this way, as long as all the doors are not closed, the pawl 23 acts so as to lock the pedal in the position shown in full lines.

When these doors are closed, the electro-magnet 22 acts upon the pawl so as to release it from the stop 24a and permit the pedal 24 to return to its original position shown in dotted lines.

In order to avoid useless expenditure of current, the circuit of the electro-magnet 22 is broken as soon as the pedal has moved into a position such that the pawl 23 can no longer come into engagement with the stop 24a. This break of the circuit is obtained by a switch 25 closed by the pedal 24 when the latter reaches the end of its travel.

The pedal 24 is formed either by the clutch pedal or by the brake pedal. When it comprises the first, this pedal is held in its disengaged position (position shown in full lines) as long as all the doors have not been closed so that the starting of the vehicle by the action of its engine is impossible.

In the case in which the pedal 24 is formed by the brake pedal, the latter is held in its braking position (position shown in full lines) as long as the doors are not closed.

In the case shown in Figure 5, the contacts arranged at the end of the travel of the doors such as 20 and 20' are connected in the circuit of an electro-magnetic clutch, shown diagrammatically by E. M. This electro-magnetic clutch acts when energized so as to couple the engine to the vehicle with the transmission of the latter.

When all the doors are closed, the electro-magnetic circuit of the clutch is closed and its action is nevertheless controlled by a resistance 26 acted upon by an arm 24b rigid with the clutch pedal 24d. The clutch is disengaged by moving the pedal 24d in the direction of the arrow X. In this way the vehicle can only be started when all the doors are completely closed.

What I claim is:

1. A control system for doors of vehicles provided with a source of vacuum, comprising means for producing one of the movements of the door by the action of a reserve of energy placed on the vehicle, means for producing the reverse movement of the door by the action of the source of vacuum, and means for restoring by said reverse movement the energy expended during the first movement.

2. A control system for doors of vehicles provided with an internal combustion engine, comprising means for producing one of the movements of the door by the action of a reserve of energy placed on the vehicle, means for producing the reverse movement of the door by the action of suction of the internal combustion engine, and means for restoring by said reverse movement the energy expended during the first movement.

3. A control system for doors of vehicles provided with a source of vacuum, comprising a differential piston moving in a corresponding cylinder, a connection between the piston and the door, a communication between one of the faces of the differential piston and a charge reservoir adapted to move the piston in a predetermined direction, another communication between the other face of the piston and the source of vacuum and adapted so as to move the piston in the reverse direction.

4. A control system for doors of vehicles provided with a source of vacuum, comprising means for producing one of the movements of the door by the action of a reserve of energy placed on the vehicle, means for producing the reverse movement of the door by the action of the source of vacuum, means for restoring by said reverse movement the energy expended during the first movement, and controlling means controlled by the action of the brakes of the vehicle and permitting the door to be opened only when the brakes have been applied.

5. A control system for doors of vehicles provided with a source of vacuum and with an electric dynamo driven by the engine and intended for lighting or starting accumulators, comprising means for producing one of the movements of the door by the action of a reserve of energy placed on the vehicle, means for producing the reverse movement of the door by the action of the source of vacuum, means for restoring by said reverse movement the energy expended during the first movement, and controlling means controlled by the cut-out device of the electric dynamo and permitting the door to be opened only when the vehicle is practically at rest.

6. A control system for doors of vehicles provided with a source of vacuum, comprising means for producing one of the movements of the door by the action of a reserve of energy placed on the vehicle, means for producing the reverse movement of the door by the action of the source of vacuum, means for restoring by said reverse movement the energy expended during the first movement, and controlling means acting with respect to the speed of the vehicle and permitting the door to be opened only when the vehicle is practically at rest.

7. A control system for doors of vehicles provided with a source of vacuum, comprising means for producing one of the movements of the door by the action of a reserve of energy placed on the vehicle, means for producing the reverse movement of the door by the action of the source of vacuum, means for restoring by said reverse movement the energy expended during the first movement, resilient means tensioned by the closure of the door, and emergency means acting for permitting the opening of the door by the action of said resilient element.

8. A control system for doors of vehicles provided with a source of vacuum, comprising means for producing one of the movements of the door by the action of a reserve of energy placed on the vehicle, means for producing the reverse movement of the door by the action of the source of vacuum, means for restoring by said reverse movement the energy expended during the first movement, resilient means tensioned by the closure of the door, emergency means acting for permitting the opening of the door by the action of said resilient element, and means for preventing the escape of energy intended to close the door.

9. A control system for doors of vehicles provided with a source of vacuum, comprising means for producing one of the movements of the door by the action of a source of energy placed on the vehicle, means for producing the reverse movement of the door by the action of the source of vacuum, means for restoring by said reverse movement the energy expended during the first movement, hydraulic means adapted to prevent the opening of the door, and means for cancelling the action of the said hydraulic means when the door must be opened.

10. A control system for doors of vehicles provided with a source of vacuum, comprising means for producng one of the movements of the door by the action of a source of energy placed on the vehicle, means for producing the reverse movement of the door by the action of the source of vacuum, means for restoring by said reverse movement the energy expended during the first movement, and means controlled by the closure of the door for permitting the starting of the vehicle when the door is closed.

11. A control system for doors of vehicles provided with a source of vacuum, comprising means for producing one of the movements of the door by the action of a source of energy placed on the vehicle, means for producing the reverse movement of the door by the action of the source of vacuum, means for restoring by said reverse movement the energy expended during the first movement, means for locking the clutch or the brake pedal of the vehicle in their disengaged or braking position when the door is opened, and means for liberating said pedal when the door is closed.

12. A control system for doors of vehicles provided with a source of vacuum, comprising means for producing one of the movements of the door by the action of a source of energy placed on the vehicle, means for producing the reverse movement of the door by the action of the source of vacuum, means for restoring by said reverse movement the energy expended during the first movement, an electric clutch for coupling, when traversed by electric current, the engine of the vehicle with the transmission of the latter, and means for controlling the electric circuit of the electric clutch by the closure of the door so that the transmission is operative when the door is closed.

In testimony whereof I have signed my name to this specification.

HENRI PIEPER.